US011131265B2

(12) United States Patent
Sixel et al.

(10) Patent No.: US 11,131,265 B2
(45) Date of Patent: Sep. 28, 2021

(54) KNOCK MITIGATION AND CYLINDER BALANCING IN AN INTERNAL COMBUSTION ENGINE

(71) Applicant: Caterpillar Motoren GmbH & Co. KG, Kiel (DE)

(72) Inventors: Eike Sixel, Kiel (DE); Scott Fiveland, Peoria, IL (US); Aradhita Chakrabarty, Peterborough (GB); Daniel Wester, Kiel (DE); Hannes Marscheider, Kiel (DE); Andre Schmidt, Kiel (DE)

(73) Assignee: Caterpillar Motoren GbmH & Co. KG, Kiel (DE)

( * ) Notice: Subject to any disclaimer, the term of this patent is extended or adjusted under 35 U.S.C. 154(b) by 0 days.

(21) Appl. No.: 16/432,641

(22) Filed: Jun. 5, 2019

(65) Prior Publication Data

US 2019/0376463 A1  Dec. 12, 2019

(30) Foreign Application Priority Data

Jun. 6, 2018 (GB) ...................................... 1809321

(51) Int. Cl.
*F02D 41/00* (2006.01)
*F02D 41/24* (2006.01)
(Continued)

(52) U.S. Cl.
CPC ....... *F02D 41/2451* (2013.01); *F02D 19/024* (2013.01); *F02D 35/027* (2013.01); *F02D 41/0027* (2013.01)

(58) Field of Classification Search
CPC ............. F02D 41/2451; F02D 41/0027; F02D 19/024; F02D 35/027; F02D 2041/281; Y02T 10/20; Y02T 10/30
See application file for complete search history.

(56) References Cited

U.S. PATENT DOCUMENTS

| 4,936,277 A * | 6/1990 | Deutsch | ................ F02D 35/027 |
| | | | 123/436 |
| 6,230,683 B1 * | 5/2001 | zur Loye | .............. F02D 19/081 |
| | | | 123/435 |

(Continued)

FOREIGN PATENT DOCUMENTS

| DE | 10028885 B4 | 12/2010 |
| DE | 102013215924 A1 | 2/2015 |

(Continued)

OTHER PUBLICATIONS

Search Report for related United Kingdom Application No. 1809321.1; report dated Dec. 16, 2018.

*Primary Examiner* — Phutthiwat Wongwian
*Assistant Examiner* — Sherman D Manley

(57) ABSTRACT

An engine control system comprises a balancing arrangement together with a knock mitigation controller configured to implement a knock mitigation procedure wherein an offset input value ($V_I$) is applied to the balancing algorithm. The offset input value ($V_I$) may cause the balancing algorithm to adjust the control output ($O_1$) for the respective one of the combustion chambers to progressively vary the fuel supply or ignition timing for the affected cylinder to mitigate the knock condition. Alternatively, the controller may generate an offset output value ($V_O$) to more rapidly vary the fuel supply or ignition timing, with the offset input value ($V_I$) being selected for example to compensate for the resulting change in the control input ($I_1$) from the cylinder to the balancing algorithm, or to provide additional, more gradual adjustment to further mitigate the knock condition.

7 Claims, 3 Drawing Sheets

(51) Int. Cl.
*F02D 19/02* (2006.01)
*F02D 35/02* (2006.01)

(56) References Cited

U.S. PATENT DOCUMENTS

| | | | |
|---|---|---|---|
| 6,276,334 B1* | 8/2001 | Flynn | F02D 13/0215 123/435 |
| 6,286,482 B1* | 9/2001 | Flynn | F02M 31/20 123/435 |
| 7,231,905 B1* | 6/2007 | Haskara | F02D 35/028 123/435 |
| 7,421,330 B2 | 9/2008 | Saikkonen et al. | |
| 7,957,889 B2 | 6/2011 | Portin et al. | |
| 9,670,828 B2 | 6/2017 | Ernst et al. | |
| 2004/0084018 A1* | 5/2004 | Zhu | F02P 3/051 123/406.14 |
| 2004/0084019 A1* | 5/2004 | Zhu | F02P 3/0453 123/406.21 |
| 2005/0072402 A1* | 4/2005 | Zurloye | F02D 41/3047 123/304 |
| 2007/0119425 A1* | 5/2007 | Lewis | F02M 25/0228 123/478 |
| 2007/0150165 A1* | 6/2007 | Saikkonen | F02D 35/027 701/104 |
| 2009/0132145 A1* | 5/2009 | Angeby | F02D 41/2477 701/102 |
| 2011/0017173 A1* | 1/2011 | Portin | F02D 41/0085 123/435 |
| 2014/0000552 A1 | 1/2014 | Glugla et al. | |
| 2015/0226144 A1* | 8/2015 | Sixel | F02D 41/1498 123/406.21 |
| 2016/0169133 A1* | 6/2016 | Yeager | F02D 19/0647 123/435 |
| 2016/0305351 A1* | 10/2016 | Barta | F02P 5/152 |
| 2016/0377500 A1* | 12/2016 | Bizub | G01M 15/05 123/406.34 |
| 2017/0122246 A1* | 5/2017 | Ottikkutti | F02D 41/402 |
| 2017/0218863 A1* | 8/2017 | Geckler | F02D 41/005 |
| 2019/0376463 A1* | 12/2019 | Sixel | F02D 35/023 |

FOREIGN PATENT DOCUMENTS

| | | |
|---|---|---|
| EP | 2907993 A1 | 8/2015 |
| EP | 2262999 B1 | 11/2016 |
| KR | 20140117920 A | 10/2014 |
| KR | 20160041523 A | 4/2016 |
| KR | 2016-0149575 | 12/2016 |
| WO | WO 2017/196481 | 12/2016 |
| WO | WO 2016/201472 | 11/2017 |

* cited by examiner

KNOCK MITIGATION AND CYLINDER BALANCING IN AN INTERNAL COMBUSTION ENGINE

CROSS-REFERENCE TO RELATED APPLICATION

This application claims priority under 35 USC § 119 and the Paris Convention to United Kingdom Patent Application No. 1809321.1 filed on Jun. 6, 2018.

TECHNICAL FIELD

This disclosure relates to control systems for balancing the output of multiple combustion chambers and for detecting and mitigating a knock condition in an internal combustion engine.

BACKGROUND

Knocking is a phenomenon wherein the fuel in a combustion chamber of an internal combustion engine is detonated other than by the flame front produced by the engine's ignition system, resulting in elevated pressure in the combustion chamber. It affects many engine types and particularly gas or dual fuel engines.

Typically such engines are piston engines with the combustion chambers configured as cylinders, although the present disclosure may also be applied to the operation of other engine types as known in the art. Accordingly, in this specification, the terms "cylinder" and "piston" should be construed to refer more broadly to the combustion chamber and moving element, respectively. The term "cylinder" is also used more generally to refer to the respective combustion chamber or its moving element as the context requires.

It is common, especially in larger internal combustion engines to balance the torque applied by each piston to the crankshaft.

For example, U.S. Pat. No. 7,421,330 teaches an internal combustion engine having a control system which controls the fuel supply to each cylinder to balance the power output from the cylinders. When a persistent knock condition is detected by a pressure or vibration sensor, the control system is configured to reduce the fuel supply progressively to the affected cylinder until the cylinder stops knocking, and then to progressively increase the fuel supply again to define a new target value for the fuel supply to the affected cylinder at which knocking does not occur. The control system then applies the new target value to control the fuel supply for further operation of the engine, and adjusts the fuel supply to the remaining cylinders to compensate for any power reduction from the affected cylinder.

It is also known, for example, from KR20160041523A to adjust the ignition timing to mitigate knocking in one cylinder.

An engine balancing system will typically be controlled by an algorithm to provide a gradual, iterative adjustment of the operation of each cylinder based on input signals from sensors arranged to sense the cylinder pressure or other operating parameters.

In this specification, an algorithm means an arrangement for producing an output or outputs based on an input or inputs in accordance with a set of defined rules, steps or relationships. An algorithm may be for example a computer program running on a processor.

Gradual adjustment is desirable for various reasons. For example, it is known that local hot spots in a cylinder may affect ignition of the mixture (the charge of fuel and air) in the cylinder, and hot spots may change in intensity over a time period depending on the operational state of the cylinder. Similarly, adjustments to the pressure or flow rate of a gaseous fuel supply may have a somewhat delayed effect on the operation of the cylinder. Moreover, the cylinders are interdependent and may be affected by a fluctuating load on the engine. Thus, an algorithm providing gradual adjustment may provide more stable control of the engine.

Heavy (i.e. severe) knocking can cause serious damage and so it is desirable to mitigate knocking as rapidly as possible, for example, by immediately reducing the fuel supply to the affected cylinder.

However, if a balancing system is provided, the balancing system may detect the resulting loss of power from the cylinder and attempt to increase the fuel supply again, ultimately restoring the cylinder to a knocking condition. In addition, the control outputs from the balancing system may be perturbed by the sudden change in cylinder power, resulting in transient instability.

Thus, it is necessary to manage the balancing system to accommodate the knock mitigation strategy.

One way of doing this is to reconfigure the balancing system to a new target value established by a knock mitigation control routine, as taught for example by U.S. Pat. No. 7,421,330.

This may be done for example by disabling the balancing system while the knock mitigation control routine is carried out, and then re-enabling the balancing system once a new target value for the fuel supply (or other adjustable parameter) is established.

One problem with this method is that the balancing system may require some time to re-establish stable control of the engine based on the new sensed operating parameters of the cylinders, so that the knock condition produces a prolonged disruption, not only to the affected cylinder but to the normal operation of the whole engine.

SUMMARY

According to the various aspects of the present disclosure there are provided an engine control system, and a method for controlling an internal combustion engine, as defined in the claims.

The engine may be of conventional design and comprises a plurality of combustion chambers, each combustion chamber comprising a respective one of a plurality of moving elements, the moving elements being operatively connected to an output shaft and moveable to drive the output shaft in rotation.

The control system includes a fuel supply and ignition system, a controller, and a sensing arrangement.

The fuel supply and ignition system is arranged to supply a variable charge of fuel and air to each combustion chamber, and to control ignition of the fuel in each combustion chamber at a timing relative to the movement of the respective moving element.

The sensing arrangement is arranged to sense for each combustion chamber at least one operational parameter, including at least an internal pressure of the combustion chamber, and to generate for each combustion chamber a control input representing the sensed at least one operational parameter.

The controller is configured to receive the control input for each combustion chamber and to generate a control output for each combustion chamber.

The fuel supply and ignition system is controllable by the control output from the controller for each combustion chamber to vary at least one of the charge and the timing for the respective combustion chamber.

The controller includes a balancing arrangement, which is configured to iteratively adjust each of the control outputs responsive to the control inputs according to a balancing algorithm to obtain a balanced condition. The balanced condition is a predefined relationship between the control inputs for all of the combustion chambers.

The controller is further configured in accordance with the novel method to identify, based on the control inputs, a knock condition in a respective one of the combustion chambers, and responsive at least to identifying the knock condition, to implement a knock mitigation procedure.

According to the knock mitigation procedure, an offset input value is applied to the balancing algorithm, and the control output ($O_1$, $O_2$) for the respective one of the combustion chambers is adjusted to mitigate the knock condition.

BRIEF DESCRIPTION OF THE DRAWINGS

Further features and advantages will be evident from the illustrative embodiment which will now be described, purely by way of example and without limitation to the scope of the claims, and with reference to the accompanying drawings, in which:

Figure 1:
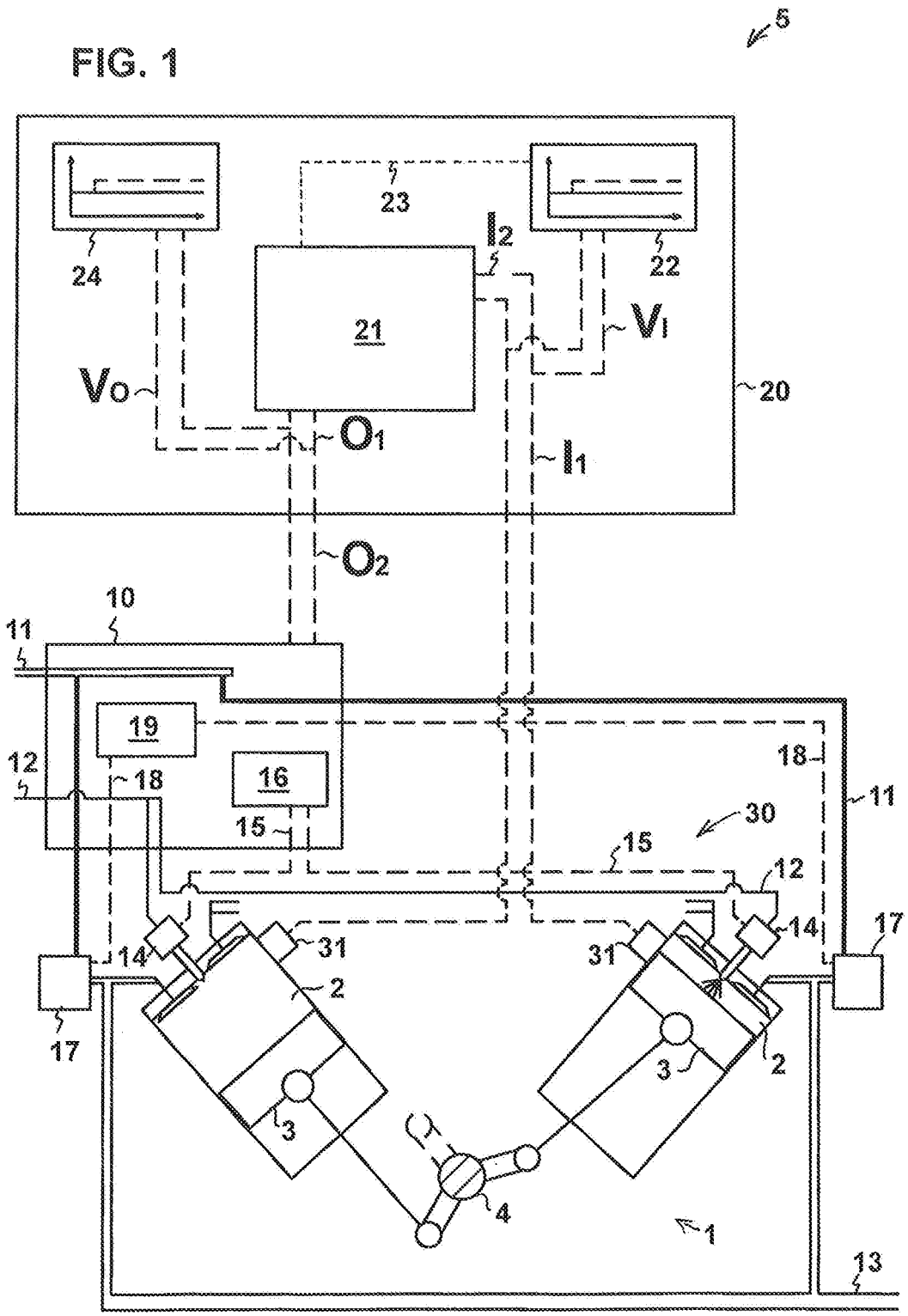
FIG. 1 shows an internal combustion engine with an engine control system.

Reference numerals and characters appearing in more than one of the drawings indicate the same or corresponding features in each of them.

DETAILED DESCRIPTION

Referring to FIG. 1, an internal combustion engine 1 comprises a plurality of combustion chambers 2, each combustion chamber comprising a respective one of a plurality of moving elements 3, the moving elements being operatively connected to an output shaft 4 and moveable to drive the output shaft in rotation. In the illustrated embodiment the engine is a conventional, micro pilot ignited gas engine, each moving element 3 comprising a piston received in a cylinder which defines the combustion chamber 2 between the piston and cylinder head as well known in the art.

The engine is equipped with a control system 5 including a fuel supply and ignition system 10, a controller 20, and a sensing arrangement 30.

The fuel supply and ignition system 10 is arranged to supply a variable charge of fuel 11, 12 and air 13 to each combustion chamber 2, and to control ignition of the fuel 11, 12 in each combustion chamber at a timing relative to the movement of the respective moving element 3 in the combustion chamber. The engine may be configured as known in the art with very early ignition timing although of course other configurations are possible.

In the illustrated example, the ignition system comprises a diesel injector 14 which is supplied at the appropriate moment during each cycle of the piston with diesel fuel 12 at a variable quantity or flow rate and at a variable timing, both controlled by an injection control signal 15 from an ignition control unit 16. The main fuel 11 is gas (e.g. natural gas, syngas, hydrogen or other known fuel gases) which is supplied by the fuel supply system at a variable quantity or flow rate via a gas admission valve 17, operated for example by a solenoid or other actuator under the control of a main fuel gas control signal 18 from a fuel gas control unit 19. The diesel fuel may be supplied in much smaller quantities than the main gas fuel and serves to ignite the main gas fuel at a moment determined by the timing of the fuel pulse from the injector 14.

The sensing arrangement 30 comprises at least one sensor 31 for each combustion chamber 2, including in particular a pressure sensor, and is arranged to sense for each combustion chamber 2 at least one operational parameter, which is to say, a measurable parameter indicating the operational state of the combustion chamber. The at least one operational parameter includes at least an internal pressure of the combustion chamber. Each sensor 31 or group of sensors 31 may include for example a vibration sensor as well as a pressure sensor, which may detect a knocking condition by vibration as well as, or instead of, an elevated pressure during the combustion cycle. Of course, temperature sensors or chemical (exhaust gas content) sensors or any other type of sensors may be included as well known in the art.

The sensing arrangement 30 comprising each sensor or sensors 31 is further arranged to generate for each combustion chamber 2 a control input $I_1$ representing the sensed at least one operational parameter. The control input $I_1$ may represent one or more momentary values of the sensed parameter or an average or calculated value of one or more sensed parameters. For example, the control input $I_1$ may comprise either or both of a peak firing pressure or an indicated mean effective pressure (IMEP) for the respective cylinder, wherein IMEP may be calculated as an average of sensed pressure in the cylinder over a part or all of its cycle.

The controller 20 is configured to receive the control input $I_1$ for each combustion chamber and to generate a control output $O_1$ for each combustion chamber 2. The control output $O_1$ may be offset by an offset output value $V_o$ as further described below to produce an adjusted control output $O_2$. (For clarity, in FIG. 1 only one set of input and output values for a single cylinder 2 are labelled.)

The control output $O_1$ or $O_2$ for each respective combustion chamber 2 is applied to control the fuel supply and ignition system 10 to vary at least one of the charge and the timing for the respective combustion chamber in order to mitigate a knock condition in the respective cylinder.

Responsive to sensing a knock condition, the control output $O_1$ or $O_2$ may be selected for example to advance or retard the timing of the respective cylinder, and/or to reduce or increase the quantity or flow rate of either or both of main gas fuel 11 and the diesel ignition fuel 12 to the respective cylinder during each cycle. The controller may select different control strategies to vary different cylinder parameters in sequence or in combination, depending on the sensor input or a preset operating configuration.

The controller 20 may comprise a computer program running on a processor with a memory and other conventional hardware as well known in the art. The controller may embody any known control arrangement suitable for use in an engine management system. For example, the controller may comprise a Proportional, Integral or Derivative controller, or a controller based on a combination of those control strategies, such as a PID (Proportional-Integral-Derivative) Controller with damping and tuning arrangements as known in the art.

The controller 20 includes a balancing arrangement 21 including a balancing algorithm, which may be implemented as a computer program running on the controller 20 hardware. Each of the control inputs $I_1$ (or a selected subset of the control inputs) may be supplied directly or indirectly to the balancing algorithm of the balancing arrangement 21, as shown in FIG. 1. The balancing arrangement 21 is configured to iteratively adjust each of the control outputs $O_1$ responsive to the control inputs $I_1$ according to the balancing algorithm to obtain a balanced condition, the balanced condition being a predefined relationship between the control inputs $I_1$ for all of the combustion chambers 2.

The balanced condition may be selected as well known in the art to obtain as nearly as possible an equalised power output from each of the cylinders, including any necessary adjustment to ensure the correct operation of each cylinder without knocking or other adverse operating conditions.

For this purpose, the balancing arrangement 21 and its balancing algorithm is configured to receive an offset input value $V_I$ which may be generated for each respective cylinder by an offset input value generating arrangement 22 of the controller, for example, a program running on the controller hardware.

In this specification, the term "offset input value" is used to indicate an input value which functions to adjust, or offset, the operation or output of the balancing arrangement 21 from what it would otherwise be, which is to say, from its normal operational condition as determined by the control inputs $I_1$ supplied by the sensing arrangement 30.

For example, in one possible arrangement, the offset input value $V_I$ for any particular one of the cylinders 2 may be applied to the balancing arrangement 21 via an input line 23 to define a new target value for the respective cylinder 2, the target values for each of the cylinders 2 representing the balanced condition, so as to reconfigure the operation of the balancing algorithm.

For example, the balanced condition might be adjusted by the offset input value $V_1$ for a respective one of the cylinders 2 to define the balanced condition as a 99% power output from a first one of the cylinders 2 and a 100.2% power output from the remaining cylinders 2, the power output being represented by the control input I for each cylinder, being for example the calculated IMEP or other suitable value or combination of values for the sensed parameters of that cylinder.

In another possible arrangement, the offset input value $V_I$ for a respective cylinder 2 may be applied to the respective control input $I_1$ from the sensing means for the respective cylinder 2 before the control input $I_1$ is supplied to the balancing arrangement 21. The combination of the control input $I_1$ and the offset input value $V_I$ results in an adjusted or offset control input which is applied to the balancing arrangement 21 as shown in FIG. 1 and in the examples of FIGS. 2, 3 and 4.

The controller 20 is configured to monitor the control inputs $I_1$ from each of the cylinders 2 and, based on the control inputs, to identify a knock condition (knocking) which may develop in any respective one of the cylinders 2. For example, the control inputs $I_1$ may include sensed vibration signals or peak pressure signals which are analysed or filtered to provide an indication of the presence and/or severity of knocking in the cylinder. For this purpose the engine control system, for example the sensing arrangement 30 or the controller 20, may include not only sensors 31 but also a signal analysis arrangement, which may be configured for example as a program running on the controller 20 hardware, as known in the art.

The controller 20 is further configured, responsive at least to identifying the knock condition, to implement a knock mitigation procedure for the respective knocking cylinder (or cylinders, if more than one are affected).

For example, the controller 20 may implement the knock mitigation procedure immediately on identifying the knock condition, or further responsive to a timing function which is arranged to allow sufficient time for transient knocking to subside, and/or a severity assessment which is configured to trigger the knock mitigation procedure only if the knocking reaches a predefined level of severity.

In accordance with the knock mitigation procedure, the controller is configured to apply an offset input value $V_I$ to the balancing algorithm as discussed above, and also to adjust the control output $O_1$ for the respective one of the cylinders 2 to mitigate the knock condition.

The adjustment of the control output $O_1$ may be carried out as a separate function of the controller in addition to the application of the offset input value $V_I$, or may be carried out by the balancing arrangement 21 in consequence of the application of the offset input value $V_I$.

These alternative possibilities will now be discussed with reference to FIGS. 2, 3 and 4 which show respectively the control inputs (I) and corresponding control outputs (O) over time (T) for each of three different modes of operation. In the illustrated examples, the control inputs I may represent for example the IMEP and/or peak pressure of the cylinder while the control outputs O may represent for example the main and/or ignition fuel supply to the cylinder.

Where the controller is arranged to adjust the control output $O_1$ directly and not as a consequence of the adjustment to the balancing arrangement 21, the controller 20 may include an offset output value generating arrangement 24, which may be for example a program running on the controller hardware and may be integrated with the offset input value generating arrangement 22.

The offset output value generating arrangement 24 is arranged to generate an offset output value $V_O$ for the respective cylinder 2, so that the control output from the controller 20 for the respective cylinder 2 comprises the offset output value $V_0$ together with the control output $O_1$.

The offset output value $V_O$ may be applied together with the control output $O_1$ either directly or indirectly to the fuel supply and ignition system 10 to vary the charge and/or the timing for the respective cylinder 2 to mitigate the knock condition.

Figure 2:
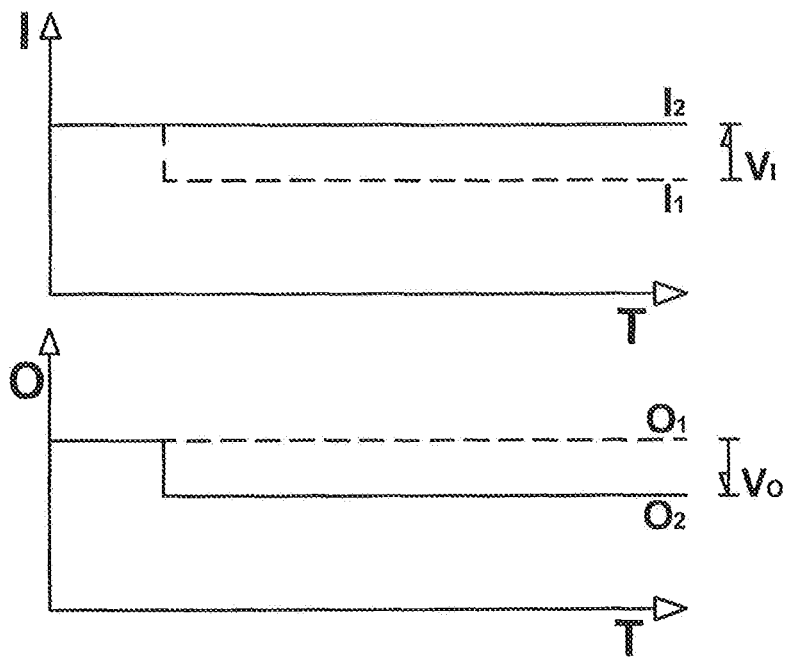
FIGS. 2, 3 and 4 show respectively three alternative modes of operation of the engine control system.
Figure 3:
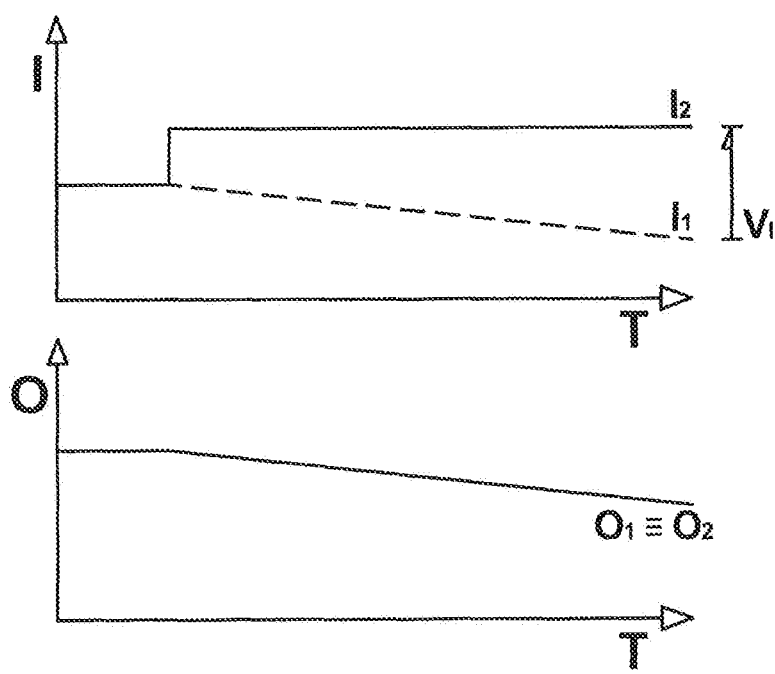
Figure 4:
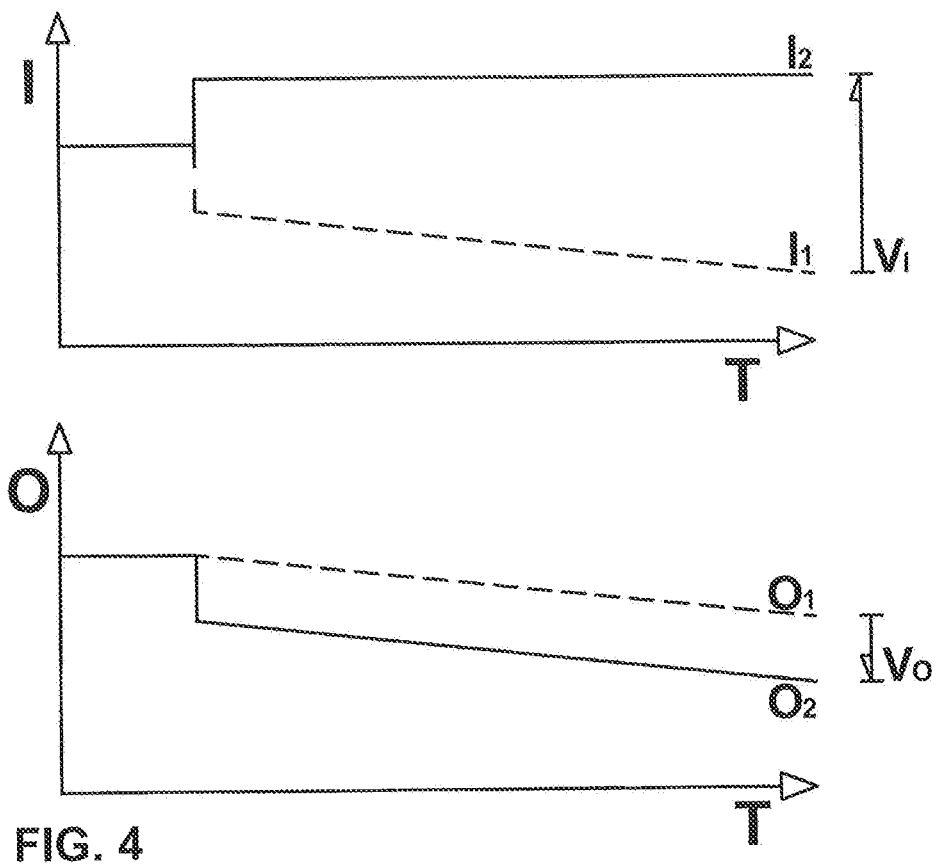

Optionally, as illustrated in FIG. 1 and in the examples of FIGS. 2, 3 and 4, the offset output value $V_O$ may be applied to the respective control output $O_1$ from the balancing arrangement 21 so that the combination of the control output $O_1$ and the offset output value $V_O$ results in an adjusted or offset control output $O_2$ which is applied to the fuel supply and ignition system 10 as shown.

FIG. 2 illustrates a first possible mode of operation, in which the adjustment to the control output $O_1$ for the respective cylinder 2 is not performed by the balancing algorithm, and the offset input value $V_I$ is selected to compensate for a change in the control input $I_1$ from the respective cylinder 2 resulting from the adjustment to the control output $O_1$.

In the illustrated example, the offset output value $V_O$ is generated as described above and applied to the control output $O_1$ to produce a rapid adjustment in the control output, indicated by the adjusted or offset control output $O_2$. The adjustment results in a rapid change in the cylinder operating condition represented by the control input $I_1$ from the respective cylinder and so rapidly mitigates the knock condition.

The simultaneous adjustment to the control input $I_1$ by the offset input value $V_1$ produces an offset control input $I_2$ which is applied to the balancing arrangement 21. The offset control input $I_2$ remains at the level of the control input $I_1$ before the adjustment, so that the balancing arrangement 21 remains unperturbed while the cylinder operates at the new, reduced power level.

FIG. 3 illustrates a second possible mode of operation, in which the controller need not (although it may) include an offset output value generating arrangement 24, so that the control output $O_1$ produced by the balancing arrangement 21 is the same as the control output $O_2$ applied to the fuel supply and ignition system 10.

In the second mode of operation, the adjustment to the control output $O_1$ for the respective cylinder 2 is performed by the balancing algorithm responsive to the offset input value $V_I$.

In the illustrated example, the control system detects a knock condition in one of the cylinders and generates an offset input value $V_I$ which is applied to the control input $I_1$ to generate an offset control input $I_2$. The balancing arrangement 21 responds to the rapid adjustment in the control input by initiating a gradual reduction in the control output $O_1$ for the respective cylinder 2, which in turn causes a gradual reduction in the operating parameter reflecting the knocking condition and represented by the control input $I_1$, progressively mitigating the knock condition. The control input $I_2$ may be adjusted over time or, as illustrated, may be maintained at a constant value (by adjusting the offset input value $V_I$ to correspond to the changing control input $I_1$) so as to maintain a constant or desired rate of change of the control output $O_1$ as shown.

FIG. 4 illustrates a third possible mode of operation in which the adjustment to the control output for the respective combustion chamber 2 comprises a first, relatively rapid adjustment and a second, relatively more gradual adjustment. The first adjustment is not performed by the balancing algorithm, while the second adjustment is performed by the balancing algorithm responsive to the offset input value $V_I$.

In the illustrated example, the controller 20 detects a knock condition in one of the cylinders 2 and generates an offset output value $V_O$ as described above. The offset output value $V_O$ is applied to the control output $O_1$ for the respective cylinder 2 to produce a rapid adjustment in the offset control output $O_2$, represented by the vertical portion of the solid line on the output (O) graph.

The adjustment results in a rapid change in the cylinder operating condition, represented by the control input $I_1$ from the respective cylinder 2 at the vertical portion of the broken line on the input (I) graph, and so rapidly mitigates the knock condition.

At the same time, the controller 20 applies a variable offset input value to the respective control input $I_1$ resulting in a rapid adjustment to the offset control input $I_2$ as represented by the vertical portion of the solid line on the input (I) graph.

The balancing arrangement 21 responds to the rapid adjustment in the control input by initiating a gradual reduction in the control output $O_1$ for the respective cylinder 2. The offset control output $O_2$ follows this reduction which in turn causes a gradual reduction in the operating parameter reflecting the knocking condition and represented by the control input $I_1$, progressively further mitigating the knock condition. The control input $I_2$ may be adjusted over time or, as illustrated, may be maintained at a constant value (by adjusting the offset input value $V_I$ to correspond to the changing control input $I_1$) so as to maintain a constant or desired rate of change of the control output $O_2$ as shown.

In each of the above described or other possible modes of operation, the controller may be further configured, after applying the offset input value $V_I$ to the balancing algorithm, to reduce progressively the offset input value $V_I$ to the balancing algorithm, so as to return the operation of the affected cylinder 2 gradually towards its initial operating state as it was when the knock condition was detected.

Figure 5:
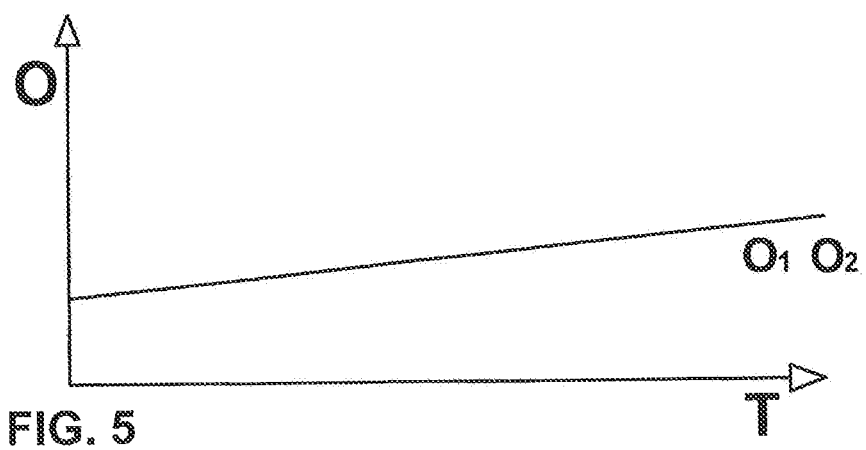
FIG. 5 shows how, following an adjustment to mitigate a knock condition, the control output may be gradually increased again towards its initial value.

FIG. 5 illustrates how the control output $O_1$ or $O_2$ may be gradually returned towards the initial condition after the adjustment as shown for example in FIG. 2, 3 or 4.

If the knock condition does not return, then the control system may be configured to revert to its original output settings.

If the knock condition does return, then the control system may be configured to preserve the last control output value $O_1$ or $O_2$ immediately before the onset of the knock condition as a new output setting. For example, the new output setting could be saved as a permanent offset input value $V_I$ which is applied either to the input to the balancing arrangement or to adjust the balancing algorithm so that the operating parameters of the cylinder 2 are adjusted permanently or for a defined period to the new values.

Optionally, the controller 20 may be configured to adjust the control output to vary both the charge and the timing for the respective combustion chamber to mitigate the knock condition. Optionally in this case, the controller may be configured to adjust the control output $O_1$ or $O_2$ to change the timing for the respective combustion chamber rapidly from a first value to a second value, and then more slowly to return the timing from the second value towards the first value, while also adjusting the control output $O_1$ or $O_2$ to reduce a quantity of the main and/or ignition fuel 11 or 12 in the charge for the respective combustion chamber 2 rapidly from a first fuel quantity to a second fuel quantity, and then more slowly to increase the quantity of the fuel progressively from the second fuel quantity towards the first fuel quantity.

This adjustment strategy is illustrated for example in FIGS. 2 and 4, in which the vertical portion of the solid output line $O_2$ indicates the rapid reduction from the first value to the second value, followed by FIG. 5 which illustrates the subsequent, gradual return of the control output $O_1$ or $O_2$ towards the initial condition.

INDUSTRIAL APPLICABILITY

The novel control system and method may be applied not only to gas or dual fuel engines but also to diesel or other types of internal combustion engine, having spark ignition or any other ignition system as known in the art, so as to provide knock mitigation while maintaining satisfactory operation of the balancing arrangement.

In summary, in embodiments, an engine control system comprises a balancing arrangement 21 together with a knock mitigation controller 20 configured to implement a knock mitigation procedure wherein an offset input value $V_I$ is applied to the balancing algorithm. The offset input value $V_I$ may cause the balancing algorithm to adjust the control output $O_1$ for the respective one of the combustion chambers 2 to progressively vary the fuel supply or ignition timing for the affected cylinder to mitigate the knock condition. Alternatively, the controller 20 may generate an offset output value $V_O$ to more rapidly vary the fuel supply or ignition timing, with the offset input value $V_I$ being selected for example to compensate for the resulting change in the control input $I_1$ from the cylinder to the balancing algorithm, or to provide additional, more gradual adjustment to further mitigate the knock condition.

Those skilled in the art will recognise that many further adaptations are possible within the scope of the claims.

In the claims, reference numerals and characters are provided in parentheses purely for ease of reference and are not to be construed as limiting features.

The invention claimed is:

1. An engine control system for controlling the operation of an internal combustion engine, the engine comprising a plurality of combustion chambers,
   each combustion chamber comprising a respective one of a plurality of moving elements, the moving elements being operatively connected to an output shaft and moveable to drive the output shaft in rotation;
   the control system including:
      a fuel supply and ignition system,
      a controller, and
      a sensing arrangement;
   the fuel supply and ignition system being arranged to supply a variable charge of fuel and air to each combustion chamber, and to control ignition of the fuel in each combustion chamber at a timing relative to the movement of the respective moving element;
   the sensing arrangement being arranged to sense for each combustion chamber at least one operational parameter, the at least one operational parameter including at least an internal pressure of the combustion chamber, and to generate for each combustion chamber a control input (I1) representing the sensed at least one operational parameter;
   the controller being configured to receive the control input for each combustion chamber and to generate a control output (O, O1, O2) for each combustion chamber;
   the fuel supply and ignition system being controllable by the control output (O1, O2) from the controller for each combustion chamber to vary at least one of the charge and the timing for the respective combustion chamber;
   the controller including a balancing arrangement, the balancing arrangement configured to iteratively adjust each of the control outputs (O1) responsive to the control inputs (I1) according to a balancing algorithm to obtain a balanced condition, the balanced condition being a predefined relationship between the control inputs (I1) for all of the combustion chambers;
   the controller being further configured:
      to identify, based on the control inputs (I1), a knock condition in a respective one of the combustion chambers, and,
      responsive at least to identifying the knock condition, to implement a knock mitigation procedure wherein:
         an offset input value (VI) is applied to the balancing algorithm, and the control output (O1, O2) for the respective one of the combustion chambers is adjusted to mitigate the knock condition,
         the adjustment to the control output (O1, O2) for the respective combustion chamber comprises a first, relatively rapid adjustment and a second, relatively more gradual adjustment; and
         the first adjustment is not performed by the balancing algorithm; and
         the second adjustment is performed by the balancing algorithm responsive to the offset input value (VI).

2. An engine control system according to claim 1, wherein the adjustment to the control output (O1, O2) for the respective combustion chamber is performed by the balancing algorithm responsive to the offset input value (VI).

3. An engine control system according to claim 1, wherein the control inputs (I1) are supplied to the balancing algorithm, and the offset input value (VI) is applied to the respective control input (I1) for the respective combustion chamber.

4. An engine control system according to claim 1, wherein the controller is further configured, after applying the offset input value (VI) to the balancing algorithm, to reduce progressively the offset input value (VI) to the balancing algorithm.

5. An engine control system according to claim 1 wherein the controller is configured to adjust the control output (O1, O2) to vary both the charge and the timing for the respective combustion chamber to mitigate the knock condition.

6. An engine control system according to claim 5, wherein the controller is configured:
   to adjust the control output (O1, O2) to change the timing for the respective combustion chamber rapidly from a first value to a second value, and then more slowly to return the timing from the second value towards the first value; and
   to adjust the control output (O1, O2) to reduce a quantity of the fuel in the charge for the respective combustion chamber rapidly from a first fuel quantity to a second fuel quantity, and then more slowly to increase the quantity of the fuel progressively from the second fuel quantity towards the first fuel quantity.

7. A method for controlling an internal combustion engine, the engine comprising:
   a plurality of combustion chambers,
   a fuel supply and ignition system,
   a controller, and
   a sensing arrangement;
   each combustion chamber comprising a respective one of a plurality of moving elements, the moving elements being operatively connected to an output shaft and moveable to drive the output shaft in rotation;
   the fuel supply and ignition system being arranged to supply a variable charge of fuel and air to each combustion chamber, and to control ignition of the fuel in each combustion chamber at a timing relative to the movement of the respective moving element;
   the sensing arrangement being arranged to sense for each combustion chamber at least one operational parameter, the at least one operational parameter including at least an internal pressure of the combustion chamber, and to generate for each combustion chamber a control input (I1) representing the sensed at least one operational parameter;
   the controller being configured to receive the control input (I1) for each combustion chamber and to generate a control output (O, O1, O2) for each combustion chamber;
   the fuel supply and ignition system being controllable by the control output (O1, O2) from the controller for each combustion chamber to vary at least one of the charge and the timing for the respective combustion chamber;
   the controller including a balancing arrangement, the balancing arrangement configured to iteratively adjust each of the control outputs (O1) responsive to the control inputs (I1) according to a balancing algorithm to obtain a balanced condition, the balanced condition being a predefined relationship between the control inputs for all of the combustion chambers;

the method comprising:
- identifying, by the controller, based on the control inputs (I1), a knock condition in a respective one of the combustion chambers, and
- responsive to identifying the knock condition, implementing, by the controller, a knock mitigation procedure wherein:
  - an offset input value (VI) is applied to the balancing algorithm, and the control output (O1, O2) for the respective one of the combustion chambers is adjusted to mitigate the knock condition,
  - the adjustment to the control output (O1, O2) for the respective combustion chamber comprises a first, relatively rapid adjustment and a second, relatively more gradual adjustment; and
  - the first adjustment is not performed by the balancing algorithm; and
  - the second adjustment is performed by the balancing algorithm responsive to the offset input value (VI).

* * * * *